Patented Feb. 12, 1924.

1,483,327

UNITED STATES PATENT OFFICE.

WILLIAM G. BOLUS, OF RHINELANDER, WISCONSIN.

ALLOY FLUX FOR SOLDERING ALUMINUM AND PROCESS FOR FORMING SAME.

No Drawing.     Application filed October 27, 1921. Serial No. 510,846.

*To all whom it may concern:*

Be it known that I, WILLIAM G. BOLUS, a citizen of the United States, a resident of Rhinelander, in the county of Oneida and State of Wisconsin, have invented new and useful Improvements in an Alloy Flux for Soldering Aluminum and Processes of Forming Same, of which the following is a specification.

This invention relates to an alloy flux for soldering aluminum to itself or to other metals, and in the method of forming said flux.

My alloy flux consists of tin, aluminum, bismuth and silver, with or without additions of lead or other metallic elements, which I may add in order to give certain specific physical properties to my flux.

I have discovered that if extremely finely divided aluminum is alloyed with tin in such a manner as to prevent the oxidation of the aluminum, that I have a basis material with which to make a flux. I then take this basis material and add a suitable metal to impart the necessary hardness. For this purpose I prefer to use silver, although not limiting myself to this particular metal as there are other metals which when added to the flux will produce a necessary hardness, as for example, copper.

I also add to my basis metal a small proportion of bismuth, as I find that this metal apparently lowers the surface tension of my flux when in a molten state, and so allows it to flow freely and without balling up into droplets as is the case when bismuth is absent.

As examples of alloy fluxes which I have found successful I submit the following analyses:—tin 95.98, lead 1.13, silver 1.05, aluminum 0.93, tin 96.84, lead .16, silver .50, bismuth 1.00 and aluminum .50.

I must admit that as yet I do not fully understand the nature of all of the metallurgical processes which take place during the formation of my basis alloy flux, or the subsequent additions, basing my statements on the practical knowledge which I have acquired during the carrying out of the many tests which I have made. For example, I am not certain that in making my basis metal the aluminum must remain unoxidized, but I am certain that the alloying of the tin and aluminum must be carried out under certain definite conditions, hereinafter described. Furthermore I have also made successful alloy fluxes in which the bismuth originally added has oxidized out leaving no bismuth in the resulting flux which could be determined by ordinary chemical analysis.

The process of forming the alloy flux consists in melting tin upon an aluminum surface and the abrading of the aluminum surface which is under the molten tin, in such a manner that very finely divided aluminum passes into the tin and this forms what I term my basis alloy flux. I abrade the aluminum until enough of it has passed into the tin to give the tin a mushy consistency which can be readily recognized by one who has experience in the manufacture of this alloy flux such as I have had. I may do this mechanically by still another method, which consists in passing the tin thru a very small aluminum tube under a suitable pressure so that the tin, while being passed thru the aluminum tube does not come in contact with air. I have found that a suitable pressure for this purpose may be 100 lbs. per square inch. There are other modifications of the apparatus which has been described but the two given will serve to satisfy as examples.

I then take my basis alloy flux and combine with it silver, bismuth, lead or other elements substantially as has been described, this alloying taking place in any well known manner, such as melting these together in crucibles.

I may manufacture this alloy flux for use of the trade in bars, sticks, wire, powder or shavings, not limiting myself to any particular form.

For use, my flux is used for aluminum in a manner similar to that in which ordinary solder is used for tinned surfaces.

What I claim is:—

1. An alloy flux for soldering aluminum to aluminum or other metals, comprising tin, aluminum, bismuth and silver, substantially in the proportions specified.

2. An alloy flux for soldering aluminum to aluminum or other metals, comprising tin and aluminum alloyed in the manner herein described, to which has been added a suitable hardening agent, substantially in the proportions specified.

3. An alloy flux for soldering aluminum or other metals, comprising tin and aluminum alloyed in the manner herein described, to which has been added a suitable hardening agent and a surface tension reducing agent, substantially in the proportions specified.

4. The process of forming an alloy flux for aluminum soldering purposes which consists in introducing extremely finely divided aluminum into molten tin.

5. The process of forming an alloy flux for aluminum soldering purposes which consists in introducing extremely finely divided aluminum into molten tin and alloying a suitable hardening agent therewith.

6. The process of forming an alloy flux for aluminum soldering purposes which consists in introducing extremely finely divided aluminum into molten tin and alloying a suitable hardening agent therewith and also a suitable surface tension reducing agent therein.

7. The process of forming an alloy flux for aluminum soldering purposes which consists in melting tin in an aluminum container and causing an abrading action upon the aluminum surface under the tin while maintaining the tin in a molten condition.

In witness whereof, I have hereunto affixed my hand this 14th day of September, 1921.

WILLIAM G. BOLUS.